US011718342B2

(12) United States Patent
Gordon

(10) Patent No.: US 11,718,342 B2
(45) Date of Patent: *Aug. 8, 2023

(54) MODULAR CHASSIS

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,593

(22) Filed: Mar. 25, 2019

(65) Prior Publication Data

US 2019/0217887 A1 Jul. 18, 2019

Related U.S. Application Data

(63) Continuation of application No. 15/625,765, filed on Jun. 16, 2017, now Pat. No. 10,633,021.

(Continued)

(51) Int. Cl.
*B62D 21/12* (2006.01)
*B62D 65/04* (2006.01)
(Continued)

(52) U.S. Cl.
CPC ............... *B62D 7/22* (2013.01); *B60B 3/16* (2013.01); *B60B 27/0052* (2013.01); *B60B 35/128* (2013.01); *B60G 3/14* (2013.01); *B60G 3/20* (2013.01); *B60G 3/202* (2013.01); *B60G 7/001* (2013.01); *B60G 7/005* (2013.01); *B60G 7/008* (2013.01); *B60G 7/02* (2013.01); *B60G 15/063* (2013.01); *B60G 17/00* (2013.01); *B60K 17/16* (2013.01); *B60K 17/306* (2013.01); *B60R 19/54* (2013.01); *B62D 3/02* (2013.01); *B62D 7/16* (2013.01); *B62D 7/166* (2013.01);
(Continued)

(58) Field of Classification Search
CPC ...... B62D 21/12; B62D 63/025; B62D 65/04; B62D 25/08; B62D 23/005; B60G 2206/011
USPC ...................................... 280/785; 296/193.04
See application file for complete search history.

(56) References Cited

U.S. PATENT DOCUMENTS

| 4,422,685 A | 12/1983 | Bonfilio |
| 4,533,172 A | 8/1985 | Oliver |

(Continued)

FOREIGN PATENT DOCUMENTS

| EP | 278479 | 8/1988 |
| WO | WO-2009017533 | 2/2009 |

*Primary Examiner* — Keith J Frisby
(74) *Attorney, Agent, or Firm* — Barry Choobin; Patent 360

(57) ABSTRACT

A modular chassis is provided for an off-road vehicle to improve assembly, servicing, and repairing of a drivetrain of the off-road vehicle. The modular chassis includes a chassis to support components of the off-road vehicle. A front frame module couples with a front of the chassis, and a rear frame module couples with a rear of the chassis. The front frame module supports lower suspension arms of the off-road vehicle by way of inboard bushing joints. The front frame module supports at least a steering gear and a front differential of the off-road vehicle. The rear frame module is a tube-frame structure that supports components of the off-road vehicle. A lower portion of the rear frame module extends rearward and acutely upward to a top frame member that couples with upper side portions of the chassis. Several cross-members impart structural integrity to the rear frame module.

1 Claim, 9 Drawing Sheets

Related U.S. Application Data

(60) Provisional application No. 62/480,960, filed on Apr. 3, 2017.

(51) Int. Cl.

| | | |
|---|---|---|
| *B62D 25/08* | (2006.01) | |
| *B62D 7/22* | (2006.01) | |
| *B60G 7/00* | (2006.01) | |
| *B60G 7/02* | (2006.01) | |
| *B60G 15/06* | (2006.01) | |
| *B62D 7/20* | (2006.01) | |
| *B60K 17/30* | (2006.01) | |
| *B60G 3/20* | (2006.01) | |
| *B62D 7/16* | (2006.01) | |
| *F16C 7/02* | (2006.01) | |
| *B62D 63/02* | (2006.01) | |
| *B60G 17/00* | (2006.01) | |
| *B62D 7/18* | (2006.01) | |
| *F16C 11/06* | (2006.01) | |
| *B60B 3/16* | (2006.01) | |
| *B60B 27/00* | (2006.01) | |
| *B60B 35/12* | (2006.01) | |
| *B60G 3/14* | (2006.01) | |
| *F16D 3/30* | (2006.01) | |
| *B60K 17/16* | (2006.01) | |
| *B60R 19/54* | (2006.01) | |
| *B62D 3/02* | (2006.01) | |
| *B62D 21/11* | (2006.01) | |
| *B62D 23/00* | (2006.01) | |
| *B62D 27/02* | (2006.01) | |
| *F16D 1/10* | (2006.01) | |

(52) U.S. Cl.
CPC ............... *B62D 7/18* (2013.01); *B62D 7/20* (2013.01); *B62D 21/11* (2013.01); *B62D 21/12* (2013.01); *B62D 23/005* (2013.01); *B62D 25/08* (2013.01); *B62D 27/023* (2013.01); *B62D 63/025* (2013.01); *B62D 65/04* (2013.01); *F16C 7/02* (2013.01); *F16C 11/0695* (2013.01); *F16D 3/30* (2013.01); *B60G 2200/14* (2013.01); *B60G 2200/144* (2013.01); *B60G 2200/156* (2013.01); *B60G 2200/44* (2013.01); *B60G 2202/312* (2013.01); *B60G 2204/129* (2013.01); *B60G 2204/143* (2013.01); *B60G 2204/148* (2013.01); *B60G 2204/30* (2013.01); *B60G 2204/416* (2013.01); *B60G 2204/62* (2013.01); *B60G 2206/11* (2013.01); *B60G 2206/12* (2013.01); *B60G 2206/50* (2013.01); *B60G 2206/72* (2013.01); *B60G 2206/73* (2013.01); *B60G 2206/84* (2013.01); *B60G 2300/07* (2013.01); *F16C 2326/24* (2013.01); *F16D 2001/103* (2013.01)

(56) References Cited

U.S. PATENT DOCUMENTS

| | | |
|---|---|---|
| 4,676,545 A | 6/1987 | Bonfilio |
| 5,332,281 A | 7/1994 | Janotik |
| 5,401,056 A | 3/1995 | Eastman |
| 5,564,745 A | 10/1996 | Morin |
| 5,833,269 A | 11/1998 | Gastesi |
| 5,882,064 A | 3/1999 | Emmons |
| 5,934,397 A | 8/1999 | Schaper |
| 6,126,113 A | 10/2000 | Navickas |
| 6,631,775 B1 | 10/2003 | Chaney |
| 6,702,058 B2 | 3/2004 | Ishii |
| 7,281,600 B2 | 10/2007 | Chernoff |
| 7,306,069 B2 | 12/2007 | Takeshima |
| 7,441,809 B1 | 10/2008 | Coombs |
| 7,618,063 B2 | 11/2009 | Takeshima |
| 8,517,423 B1 | 8/2013 | Huston |
| 9,045,014 B1 | 6/2015 | Verhoff |
| 9,303,539 B1 | 4/2016 | Peirce |
| 10,633,021 B2 * | 4/2020 | Gordon ............... B62D 27/023 |
| 11,285,994 B2 * | 3/2022 | Gordon ............... B60G 15/063 |
| 2004/0239091 A1 | 12/2004 | Horton |
| 2005/0116505 A1 | 6/2005 | Carcioffi |
| 2006/0066136 A1 | 3/2006 | Kobayashi |
| 2008/0042390 A1 | 2/2008 | Geslin |
| 2009/0236877 A1 | 9/2009 | Peschansky |
| 2009/0267337 A1 | 10/2009 | Siekaup |
| 2010/0019538 A1 | 1/2010 | Kiley |
| 2010/0230192 A1 | 9/2010 | Riley |
| 2012/0181781 A1 | 7/2012 | Gaussin |
| 2012/0197498 A1 | 8/2012 | Gaussin |
| 2013/0241237 A1 | 9/2013 | Dziuba |
| 2014/0060952 A1 | 3/2014 | Mizukura |
| 2014/0251712 A1 | 9/2014 | Brady |
| 2016/0257360 A1 | 9/2016 | MacKenzie |
| 2017/0136874 A1 | 5/2017 | Harris |
| 2017/0253271 A1 | 9/2017 | Bertezzolo |

* cited by examiner

MODULAR CHASSIS

PRIORITY

This continuation application claims the benefit of and priority to U.S. patent application Ser. No. 15/625,765 filed on Jun. 16, 2017 and U.S. Provisional Application, entitled "Off-Road Front Suspension System," filed on Apr. 3, 2017 and having application Ser. No. 62/480,960.

FIELD

The field of the present disclosure generally relates to vehicle suspension systems. More particularly, the field of the invention relates to a modular chassis for an off-road vehicle configured to improve assembly, servicing, and repairing of an off-road drivetrain of the vehicle.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scrub, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the anus may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A modular chassis is provided for an off-road vehicle and configured to improve assembly, servicing, and repairing of a drivetrain of the off-road vehicle. The modular chassis is comprised of a chassis configured to support components of the off-road vehicle, a front frame module configured to be coupled with a front of the chassis, and a rear frame module configured to be coupled with a rear of the chassis. The front frame module is configured to support a first and a second lower suspension arms of the off-road vehicle by way of inboard mounting joints of a bushing. A front mount and a rear mount disposed at opposite ends of the front frame module are configured to be fastened onto the chassis. The front frame module is further configured to support various components of the off-road vehicle, including at least a steering gear and a front differential. One or more service ports disposed on the front frame module facilitate servicing or repairing of the various components without requiring removal from the front frame module.

The rear frame module is comprised of a tube-frame structure and configured to support various components of the off-road vehicle. A lower portion of the rear frame module is comprised of parallelly disposed, or angled, bottom frame members that extend rearward with respect to the chassis. Each bottom frame member extends a bent portion that joins with an angled frame member that extends upwards along a lower rear portion of the off-road vehicle. The angled frame members each extend to a bent portion that joins with a vertical frame member that extends acutely toward a top frame member. The top frame member comprises a rear-most portion of the rear frame module and is configured to be coupled with upper side portions of the chassis by way of a top mount disposed at each end of the top frame member. The rear frame module is centrally disposed with respect to a midline of the chassis and configured to provide clearance for vertical motion of rear trailing arms disposed adjacently to each of the bottom frame members. Several cross-members are disposed between the bottom frame members, the angled frame members, and the vertical frame members to impart structural integrity to the rear frame module.

In an exemplary embodiment, a modular chassis for an off-road vehicle comprises a chassis configured to support components of the off-road vehicle; a front frame module configured to be coupled with a front of the chassis; and a rear frame module configured to be couple with a rear of the chassis.

In another exemplary embodiment, the front frame module is configured to support a first lower suspension arm on a passenger side and a second lower suspension arm on a driver side of the off-road vehicle by way of inboard mounting joints of a bushing variety that allow the first lower suspension arm and the second lower suspension arm to pivot vertically with respect to the front frame module. In another exemplary embodiment, the front frame module is an elongate member comprised of inboard mounting brackets disposed on opposite sides in locations suitable to receive the first lower suspension arm and the second lower suspension arm.

In another exemplary embodiment, the front frame module is comprised of a front mount and a rear mount disposed at opposite ends and configured to enable fastening the front frame module to the chassis. In another exemplary embodiment, the front mount is comprised of a bracket configured to be coupled with a similar bracket disposed at a front-most portion of the chassis. In another exemplary embodiment, the rear mount is configured to be coupled with a tube-shaped member comprising the chassis, a bracket suitable for receiving the rear mount being fastened or welded onto the tube-shaped member of the chassis.

In another exemplary embodiment, the front frame module is configured to support various components of the off-road vehicle, the various components being comprised of at least a steering gear and a front differential. In another exemplary embodiment, one or more service ports are disposed on the front frame module to facilitate servicing or repairing of the various components without requiring removal from the front frame module, at least one of the one or more service ports providing access to an oil drain plug of a front differential. In another exemplary embodiment, at least one of the one or more service ports are disposed on the front frame module to allow fluids to drain from an interior of the front frame module. In another exemplary embodiment, the front frame module is comprised of one or more panels configured to protect various components coupled with the front frame module, the one or more panels being comprised of at least one debris shield to protect a steering gear and a front differential from damage due to flying road debris.

In another exemplary embodiment, the rear frame module is comprised of a tube-frame structure and configured to support various components of the off-road vehicle. In another exemplary embodiment, a frame component mount may be fastened to the chassis and located within the rear frame module so as to support various components of the off-road vehicle. In another exemplary embodiment, one or more holes are disposed in various locations of the frame component mount so as to receive the various components that are intended to be supported by the frame component mount.

In another exemplary embodiment, a lower portion of the rear frame module is comprised of parallelly disposed, or angled, bottom frame members that extend rearward with respect to the chassis, each toward a bent portion that joins each of the bottom frame members with an angled frame member that extends upwards along a lower rear portion of the off-road vehicle to a bent portion that joins each of the angle frame members with a vertical frame member that extends acutely toward a top frame member. In another exemplary embodiment, a bottom mount comprises the rear frame module and is configured to couple the bottom frame members with the chassis. In another exemplary embodiment, the bottom mount is comprised of brackets that are configured to receive suitably sized nuts and bolts that fasten the bottom frame members to the chassis, a cross-member being disposed between the bottom frame members and receivable between the brackets so as to fixedly join the bottom frame members with the chassis. In another exemplary embodiment, the bottom frame members are centrally disposed adjacent to a midline of the chassis and configured to provide clearance for vertical motion of a rear trailing arm disposed adjacently to each of the bottom frame members. In another exemplary embodiment, several cross-members are disposed between the bottom frame members, the angled frame members, and the vertical frame members and configured to impart structural integrity to the rear frame module. In another exemplary embodiment, the top frame member comprises a rear-most portion of the rear frame module and is configured to be coupled with upper side portions of the chassis by way of a top mount disposed at each end of the top frame member, the top mount being comprised of a suitable means for fixating the top frame member and the upper side portions.

BRIEF DESCRIPTION OF THE DRAWINGS

The drawings refer to embodiments of the present disclosure in which.

Figure 1:
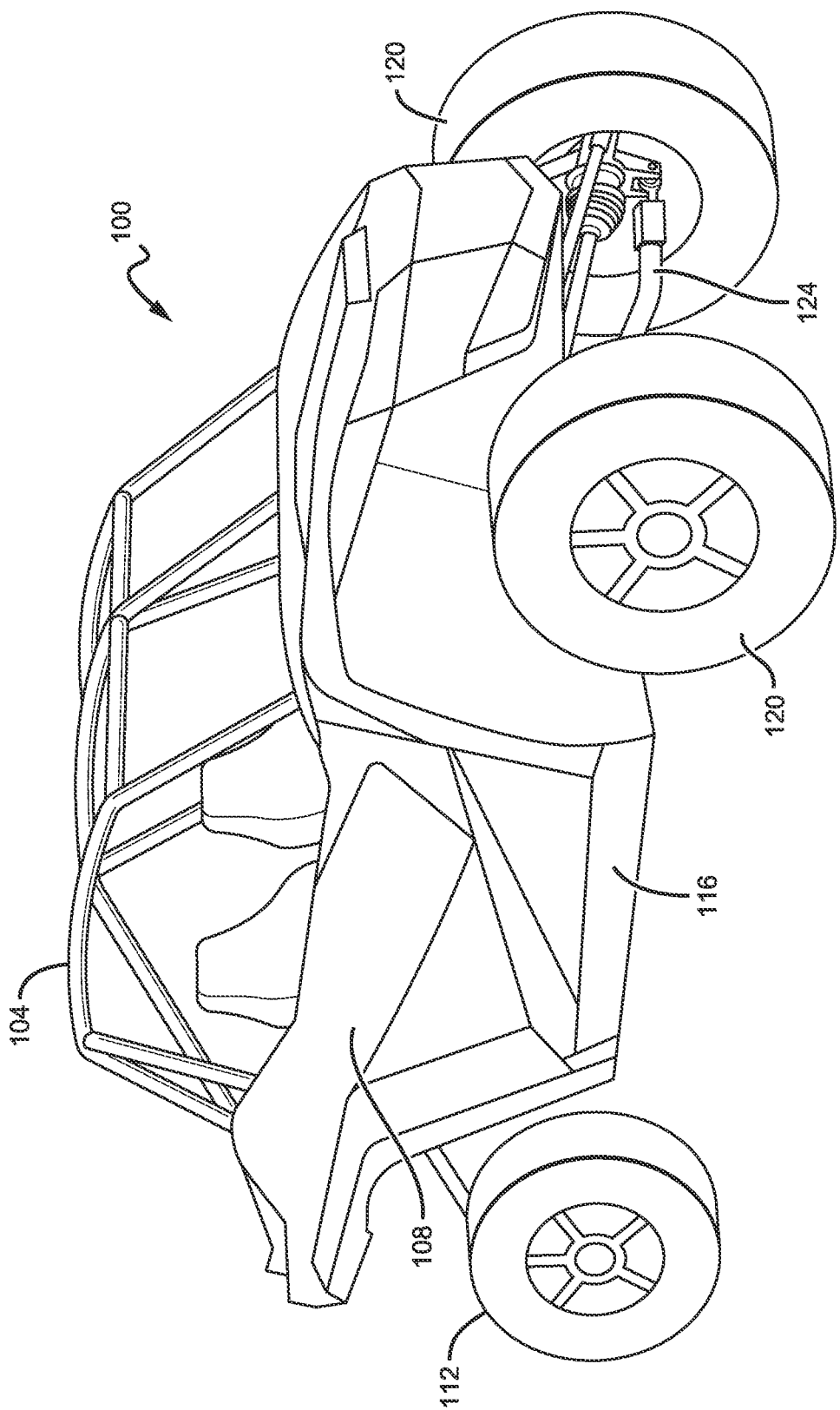
FIG. 1 illustrates an exemplary embodiment of an off-road vehicle that is particularly suitable for implementation of an off-road front suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a modular chassis for an off-road vehicle that is configured to improve assembly, servicing, and repairing of a drivetrain of the off-road vehicle. The modular chassis is comprised of a chassis configured to support components of the off-road vehicle. A front frame module is configured to be coupled with a front of the chassis, and a rear frame module is configured to be coupled with a rear of the chassis. The front frame module supports lower suspension arms of the off-road vehicle by way of inboard bushing joints that allow the lower suspension arms to pivot vertically with respect to the front frame module. The front frame module is configured to support various components of the off-road vehicle, including at least a steering gear and a front differential. One or more service ports facilitate servicing or repairing of the various components without requiring removal from the front frame module.

The rear frame module is comprised of a tube-frame structure that is configured to support various components of the off-road vehicle. A lower portion of the rear frame module is comprised of directionally-parallel bottom frame members that each extends rearward to a bent portion that joins with an angled frame member. The angled frame members each extend to a bent portion that joins with a vertical frame member that extends acutely toward a top frame member. The top frame member comprises a rearmost portion of the rear frame module that is configured to be coupled with upper side portions of the chassis. Several cross-members are disposed between the bottom frame members, the angled frame members, and the vertical frame members to impart structural integrity to the rear frame module. The rear frame module is configured to provide clearance for vertical motion of rear trailing arms disposed adjacently to each of the bottom frame members.

FIG. 1 shows an off-road vehicle 100 that is particularly suitable for implementation of a modular chassis system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system.

Figure 2:
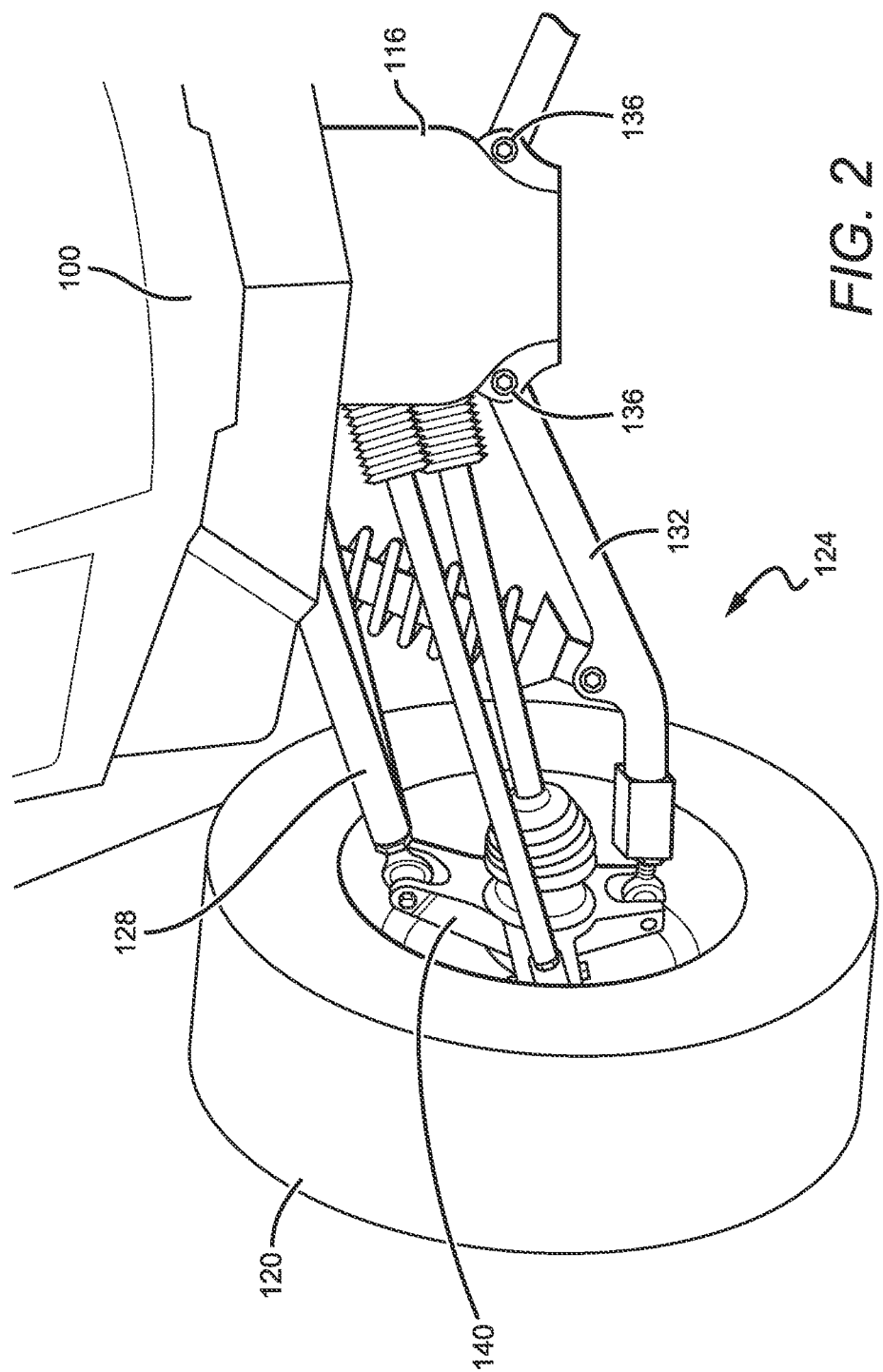
FIG. 2 illustrates a front view of a front suspension system that is configured to couple a front wheel with a passenger side of an off-road vehicle.

FIG. 2 illustrates a front view of a front suspension system 124 that is configured to couple the front wheel 120 with a passenger side of the off-road vehicle 100. The front suspension system 124 is comprised of an upper suspension arm 128 and a lower suspension arm 132 that couple the front wheel 120 with the chassis 116. Each of the upper and lower suspension arms 128, 132 comprises two inboard mounting joints 136 to the chassis 116 and one outboard mounting joint to a spindle assembly 140. As will be recognized, the upper and lower suspension arms 128, 132 generally are of a double wishbone variety of suspension that facilitates controlling various parameters affecting the orientation of the wheel 120 with respect to the off-road vehicle 100, such as, by way of non-limiting example, camber angle, caster angle, toe pattern, roll center height, scrub radius, and scrub.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantially identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100.

As will be appreciated by those skilled in the art, there may be instances wherein disassembling one or more portions of the chassis 116 may be advantageous, such as during servicing or repairing of components comprising the front suspension system 124. Further, assembling one or more portions of the chassis 116 simples manufacturing of the off-road vehicle 100, as well as facilitating repairing damaged portions of the chassis 116 without cutting and welding the chassis as is commonplace with conventional off-road vehicles. To this end, the illustrated embodiment of the chassis 116 may be comprised of one or more portions, or chassis modules, that may be assembled and disassembled, as needed.

Figure 3A:
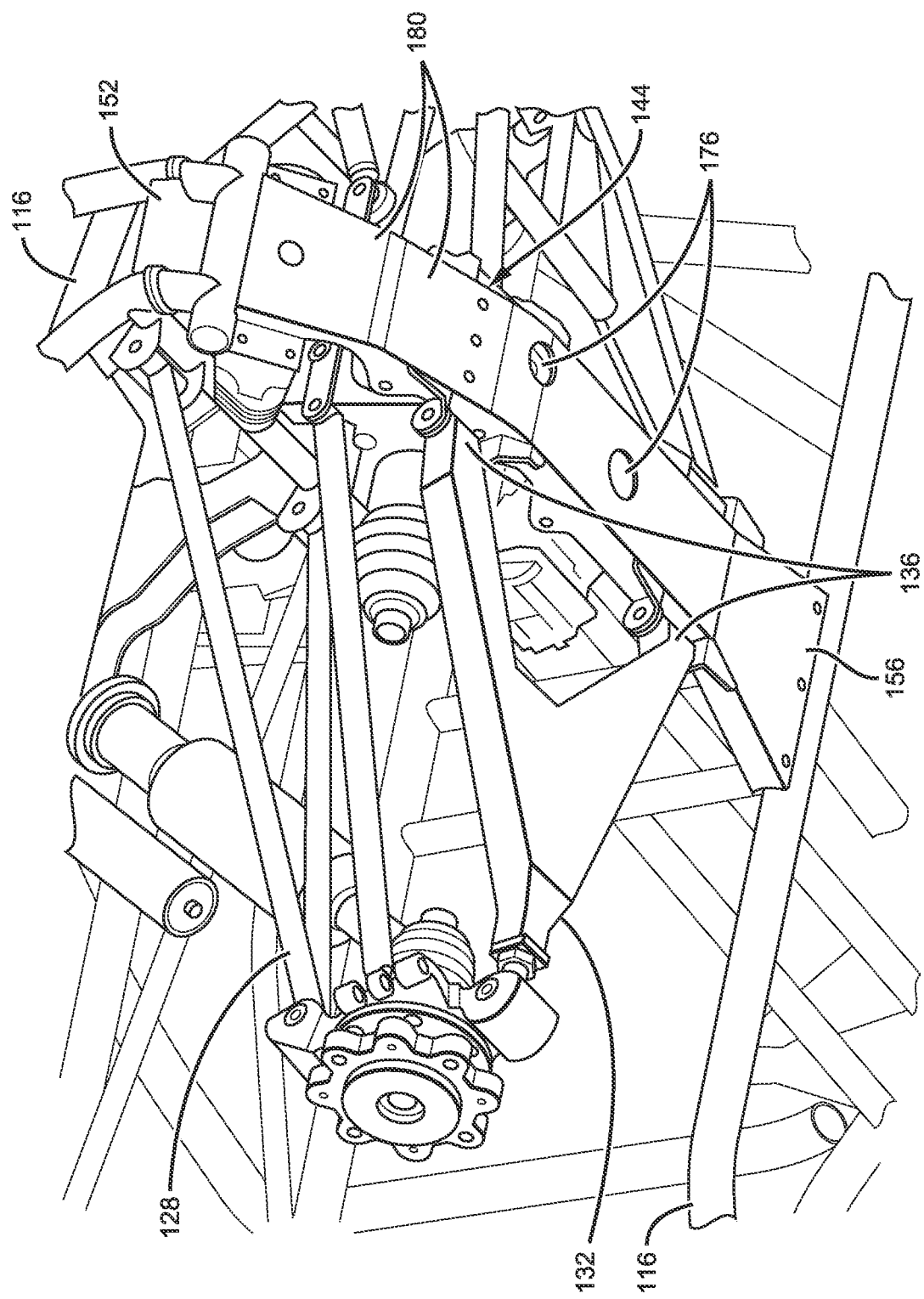
FIG. 3A illustrates an upper isometric view of an exemplary embodiment of a front frame module that is fixedly coupled with a modular chassis of an off-road vehicle.
Figure 3B:
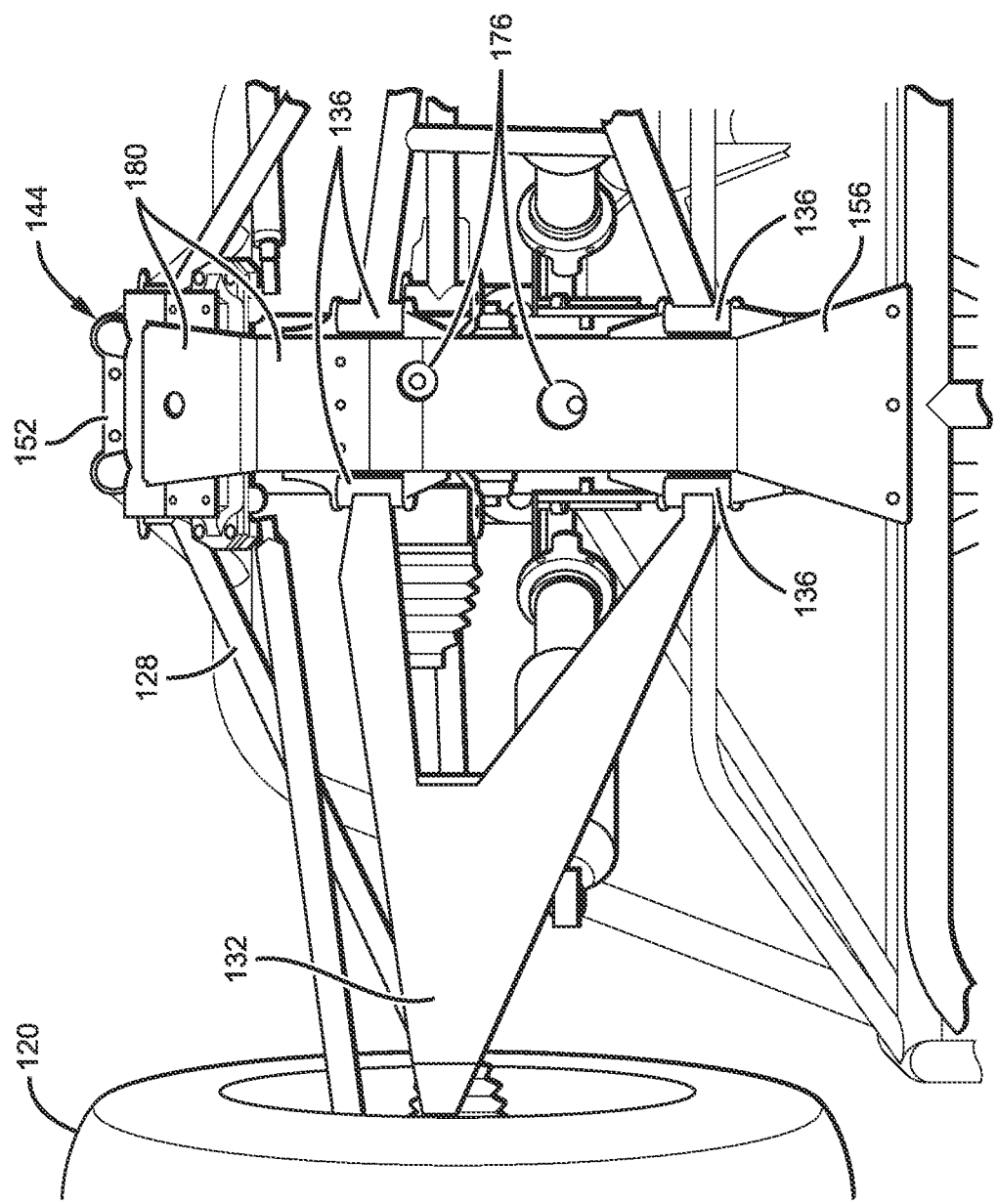
FIG. 3B illustrates a bottom plan view of the front frame module of FIG. 3A.
Figure 3C:
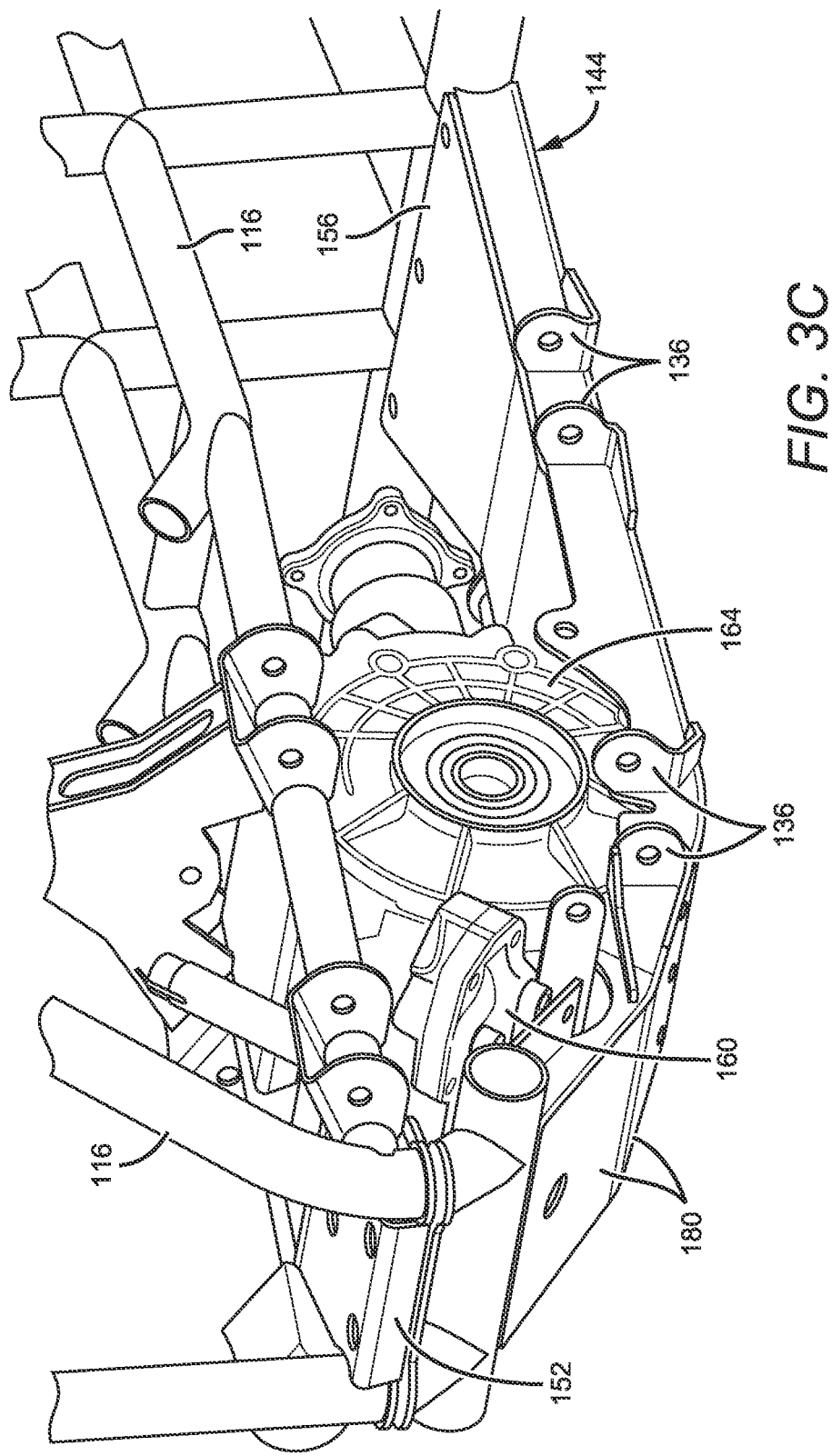
FIG. 3C illustrates an isometric view of an exemplary embodiment of a front frame module coupled with a modular chassis of an off-road vehicle and supporting a steering gear and a front differential.
Figure 4A:
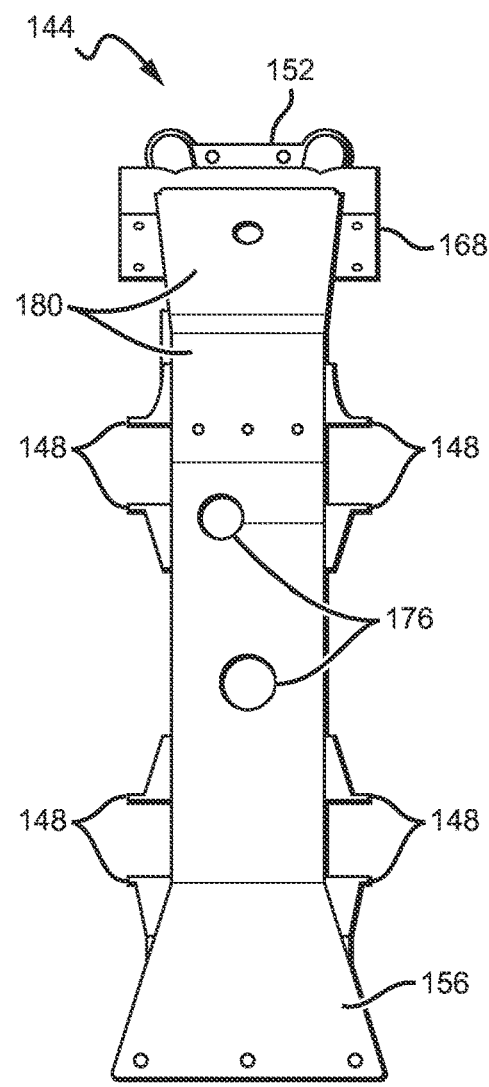
FIG. 4A illustrates a bottom plan view of an exemplary embodiment of a front frame module that may be fixedly coupled with a modular chassis of an off-road vehicle.
Figure 4B:
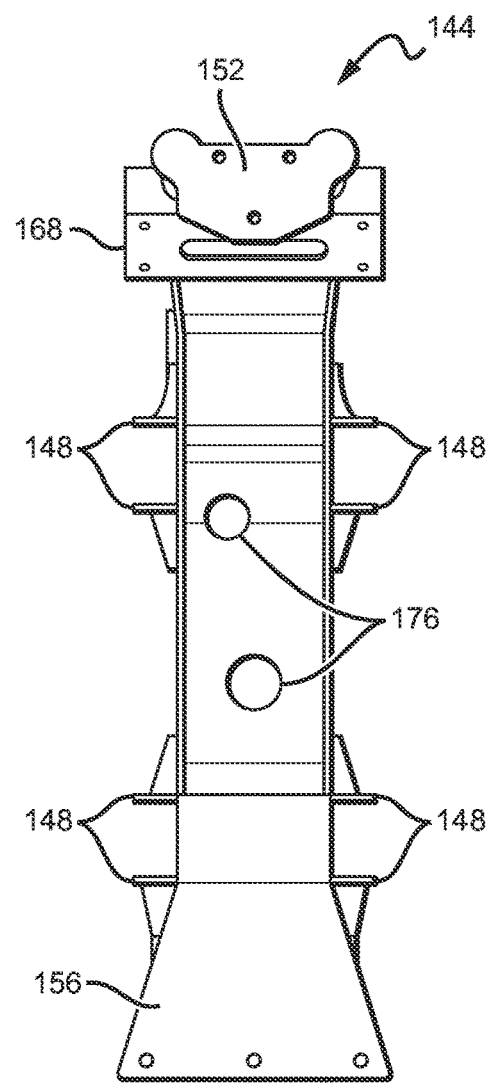
FIG. 4B illustrates a top plan view of the front frame module illustrated in FIG. 4A.
Figure 4C:
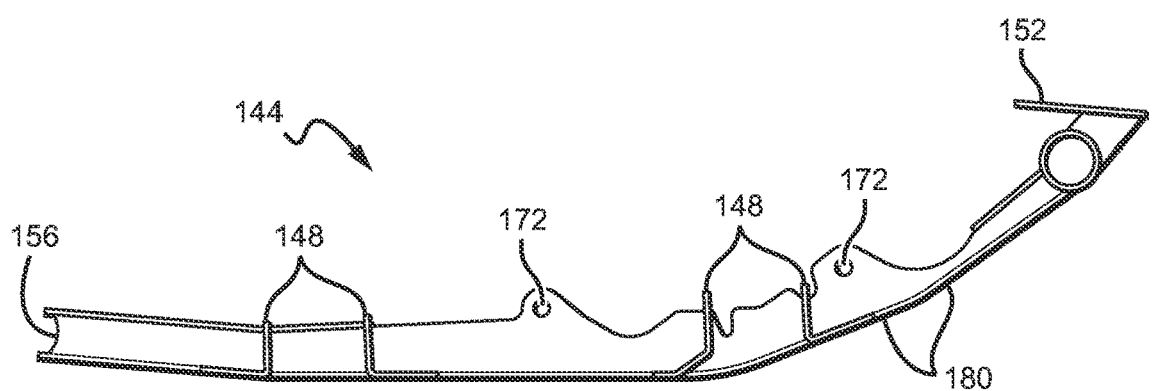
FIG. 4C illustrates a side plan view of the front frame module of FIG. 4A.

FIGS. 3A-3C illustrate an exemplary embodiment of a front frame module 144 that may be fixedly coupled with the chassis 116. The front frame module 144 generally supports the lower suspension arms 132 on the passenger and driver sides of the off-road vehicle 100 by way of the inboard mounting joints 136. The inboard mounting joints 136 preferably are of a bushing variety that allow the lower suspension arms 132 to pivot vertically with respect to the front frame module 144. As best shown in FIGS. 4A-4C, the front frame module 144 is generally an elongate member comprised of inboard mounting brackets 148 disposed on opposite sides of the front frame module in locations suitable to receive the lower suspension arms as shown in FIGS. 3A-3B. As will be appreciated, the front frame module 144 is comprised of a rigid metal, such as any of various suitable metal alloys, having a gauge thickness suitable for supporting the off-road vehicle 100 and withstanding the forces due to the lower suspension aims 132 due to travel over terrain.

The front frame module 144 is comprised of a front mount 152 and a rear mount 156 disposed at opposite ends and configured to enable fastening the front frame module to the chassis 116. In the illustrated embodiment, the front mount 152 is comprised of a bracket configured to be coupled, such as by way of nuts and bolts, with a similar bracket disposed at a front-most portion of the chassis 116. The rear mount 156 is configured to be coupled with a tube-shaped member comprising the chassis 116. In some embodiments, a bracket suitable for receiving the rear mount 156 may be fastened or welded onto the tube-shaped member of the chassis 116. It should be understood, however, that the front and rear mounts 152, 156 are not to be limited to the specific configurations shown and discussed herein, but rather the front and rear mounts 152, 156 may be comprised of any structure suitable for fixedly coupling the front frame module 144 with the chassis 116.

As best shown in FIG. 3C, the front frame module 144 may be configured to support various components of the off-road vehicle 100. For example, in the illustrated embodiment, a steering gear 160 and a front differential 164 may be fastened onto the front frame module 144. As shown in FIGS. 4A-4C, the front frame module 144 includes a steering mount 168 configured to receive the steering gear 160, and comprises a plurality of brackets 172 suitable for receiving fasteners to mount the front differential 164 onto the front frame module. It is contemplated that suitably sized nuts and bolts may be utilized to fasten the steering gear 160 onto the steering mount 168. Similarly, suitably sized bolts may be used to fasten the front differential 164 onto the plurality of brackets 172. Further, in some embodiments, the brackets 172 may be configured to receive any of various cushioning mounts, such as rubber mounts, that may be coupled between the front differential 164 and the front frame module 144.

In some embodiments, the front frame module 144 may include various ports, or openings, disposed on the front frame module to provide access to the various components fastened onto to the front frame module. In the embodiment illustrated in FIGS. 4A-4C, the front frame module 144 includes service ports 176. As will be appreciated, the service ports generally facilitate servicing or repairing of the various components without requiring removal from the front frame module 144. Those skilled in the art will recognize that the service ports 176 facilitate accessing an oil drain plug of the front differential 164 for the purpose of draining and refilling the front differential gear oil. It should be understood, however, that the front frame module 144 is not limited to the service ports 176 illustrated herein, and thus other openings and service ports may be incorporated into the front frame module 144, as deemed necessary, without limitation. For example, any of various service ports 176 may be disposed on the front frame module 144 so as to allow fluids, such as trapped water due to travel in wet conditions, to drain from an interior of the front frame module, thereby inhibiting potential corrosion of the front frame module 144.

As shown in FIGS. 3A-3C, the front frame module 144 may be comprised of one or more panels that are configured to protect the various components coupled with the front frame module. For example, the illustrated embodiment of the front frame module 144 is comprised of debris shields 180 that serve to protect the steering gear 160 and the front differential 164 from damage due to flying road debris, such as rocks, that may occur during travel over rough terrain.

Figure 5A:
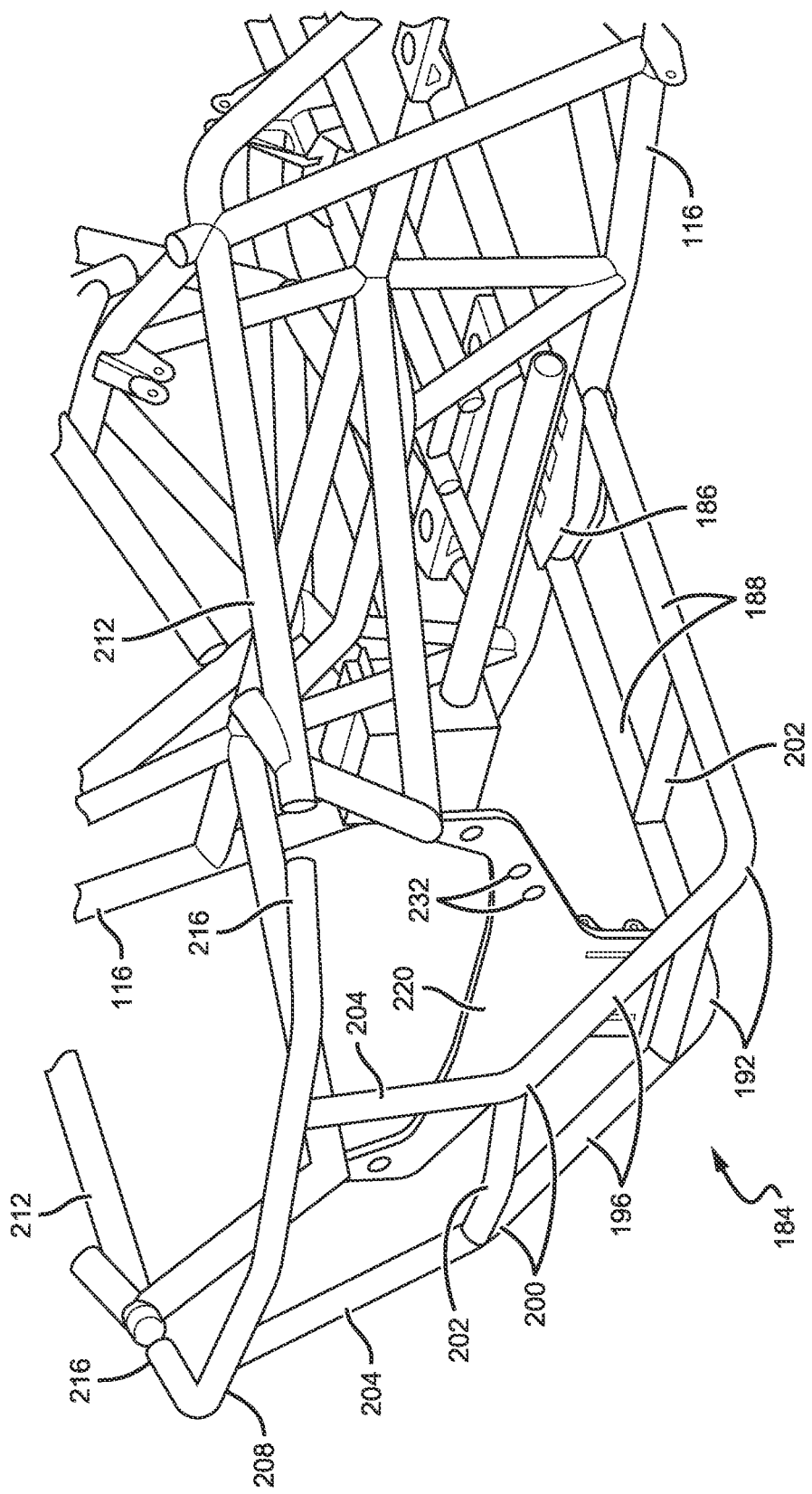
FIG. 5A illustrates an isometric view of an exemplary embodiment of a rear frame module that is fixedly coupled with a modular chassis of an off-road vehicle.
Figure 5B:
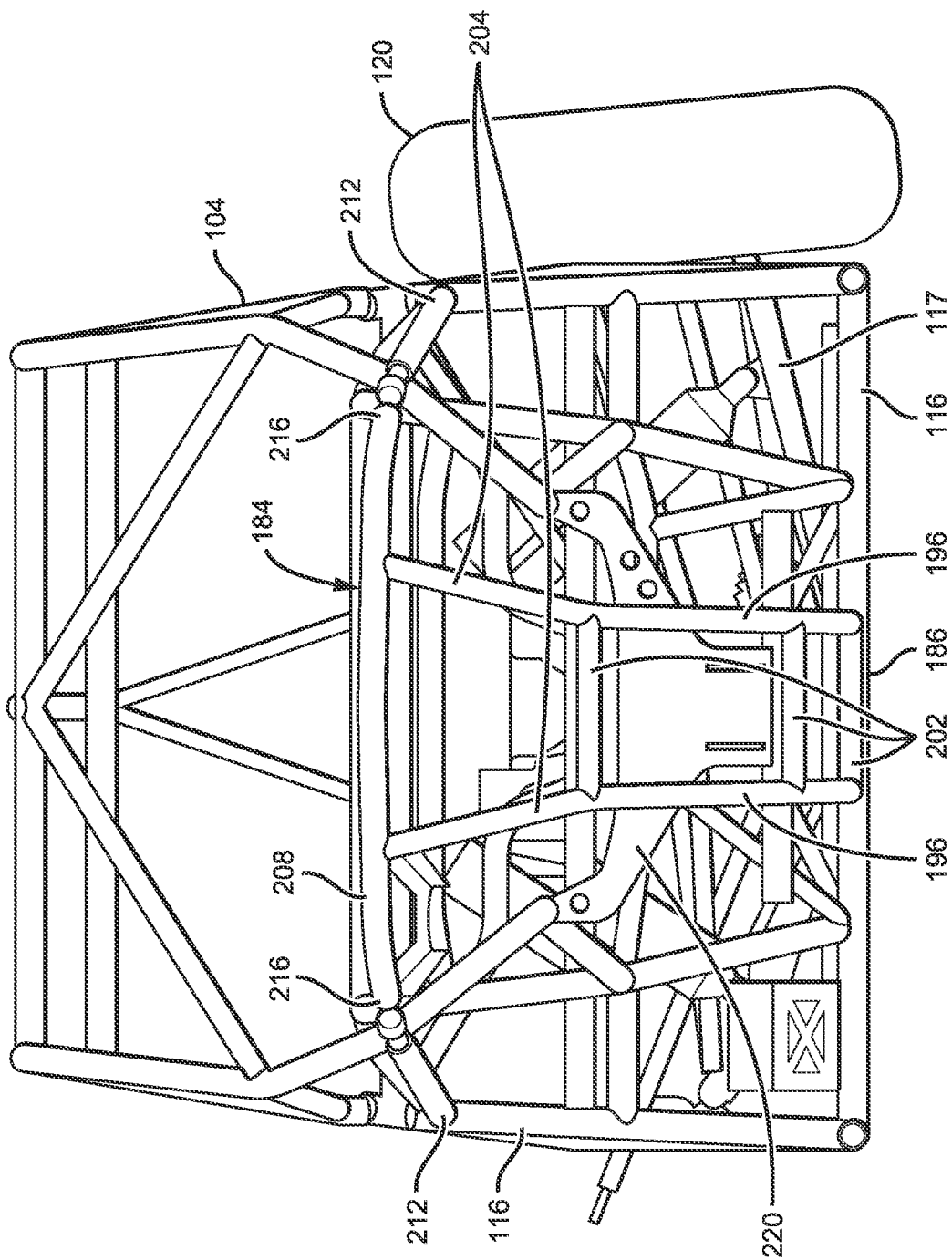
FIG. 5B illustrates a rear plan view of the rear frame module coupled with the modular chassis of the off-road vehicle as illustrated in FIG. 5A.

FIGS. 5A-5B illustrate an exemplary embodiment of a rear frame module 184 that may be fixedly coupled with the chassis 116. The rear frame module 184 generally is comprised of a tube-frame structure that is configured couple with the chassis 116 and to support various engine components, as well as a transaxle and rear differential (not shown). The rear frame module 184 may be comprised of any suitably rigid metal, or non-ferrous materials, such as any of various metal alloys, having a gauge thickness suitable for supporting the off-road vehicle 100 and withstanding forces typically encountered during travel over rough terrain.

As best shown in FIG. 5A, a lower portion of the rear frame module 184 is comprised of parallelly disposed bottom frame members 188 that extend rearward with respect to the chassis 116, each toward a bent portion 192. A bottom mount 186 is configured to couple the bottom frame members 188 with the chassis 116. The bottom mount 186 may be comprised of brackets that are configured to receive suitably sized nuts and bolts that fasten the bottom frame members 188 to the chassis 116. In some embodiments, a cross-member may be disposed between the bottom frame members 188 and received between the brackets so as to fixedly join the bottom frame members 188 with the chassis 116. It is contemplated that the bottom mount 186 may be comprised of any suitable means for fixating the rear frame module 184 to the chassis 116, without limitation.

in the embodiment illustrated in FIG. 5A, the bottom frame members 188 are centrally disposed adjacent to a midline of the chassis 116 and configured to provide clearance for vertical motion of driver side and passenger side rear trailing arms 117 (as shown in FIG. 5B) disposed adjacently to each of the bottom frame members 188. The bent portions 192 join each of the bottom frame members 188 with an angled frame member 196 that extends upwards along a lower rear portion of the off-road vehicle 100. A bent portion 200 joins each of the angle frame members 196 with a vertical frame member 204 that extends acutely toward a top frame member 208. Several cross-members 202 are disposed between the parallel bottom frame members 188, angled frame members 196, and vertical frame members 204. As will be appreciated, the cross-members 202 serve to fixate the parallel frame members, 188, 196, 200, and thereby impart structural integrity to the rear frame module 184.

Figure 6A:
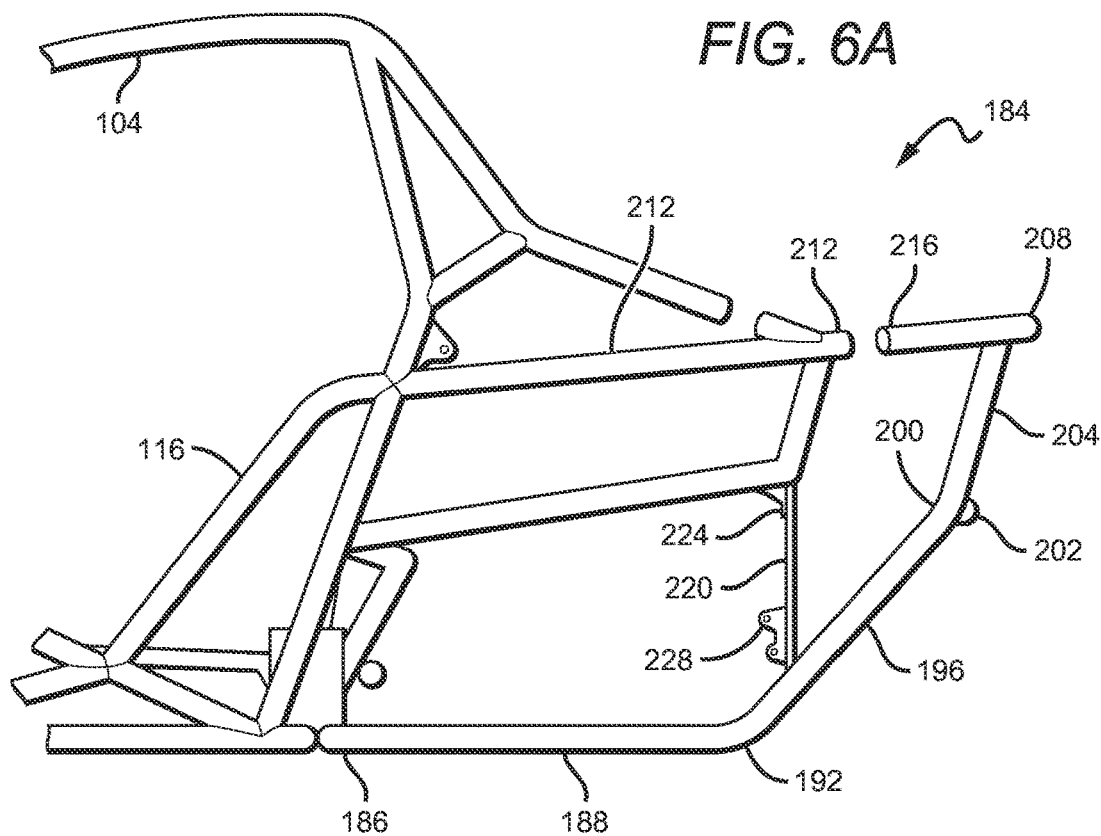
FIG. 6A illustrates a side plan view of the rear frame module coupled with the modular chassis of the off-road vehicle as illustrated in FIG. 5A.
Figure 6B:
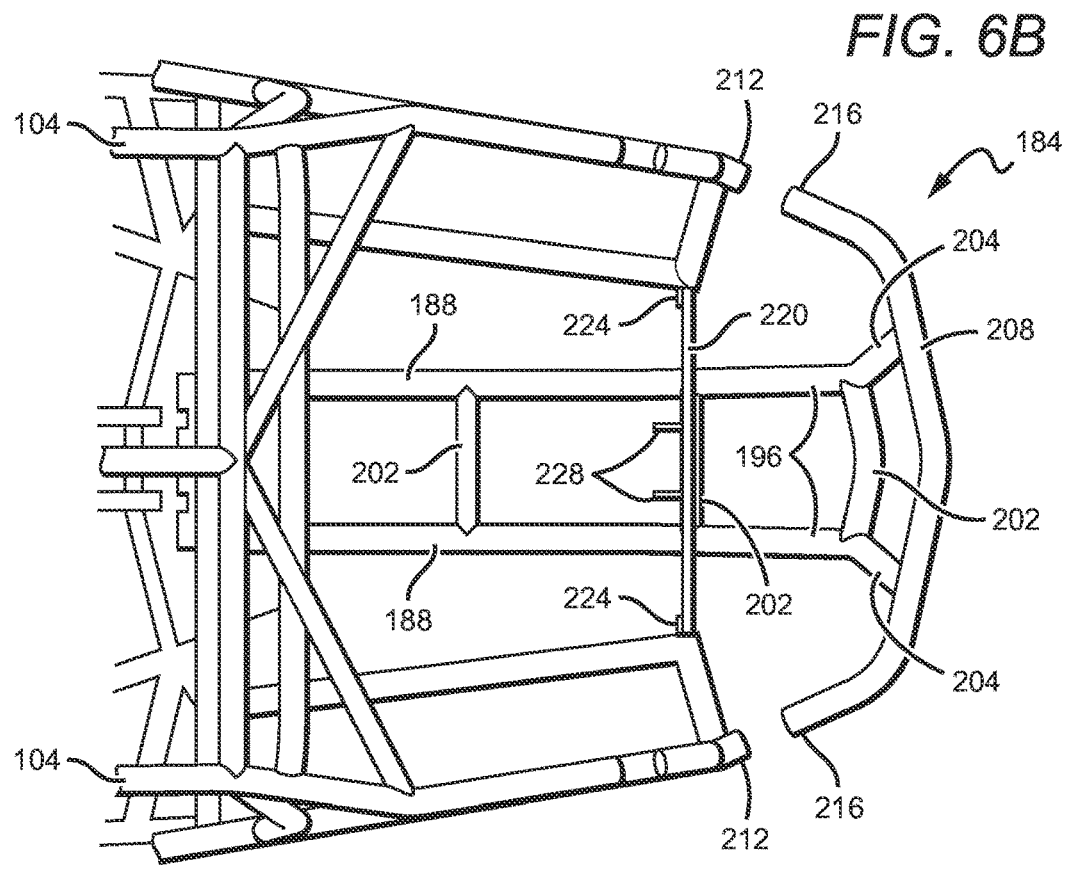
FIG. 6B illustrates a top plan view of the rear frame module coupled with the modular chassis of the off-road vehicle as illustrated in FIG. 5A.

As best shown in FIGS. 6A-6B, the top frame member 208 comprises a rear-most portion of the rear frame module 184 that may be coupled with upper side portions 212 of the chassis 116. The illustrated embodiment of the top frame member 208 is comprised of a series of straight tube portions and bent tube portions that are suitably assembled such that the top frame member 208 may be joined with the upper side portions 212 by way of a top mount 216 disposed at each end of the top frame member. The straight tube portions and the bent tube portions may be separate tube portions that are assembly to form the top frame member 208, or the straight tube portions and the bent tube portions may comprise a single tube portion that is advantageously manipulated to form the top frame member 208. Further, it is contemplated that the top mounts 216 may be comprised of any suitable means for fixating the top frame member 208 and the upper side portions 212. In some embodiments, for example, the top mounts 216 may be comprised of suitably sized couplers that are inserted between the top frame member 208 and the upper side portions 212 and then welded to fixate the rear frame module 184 and the chassis 116. Other means for fixating the top frame member 208 and the upper side portions 212 will be apparent to those skilled in the art.

It is contemplated that a wide variety of brackets and other supportive members may be coupled with the rear frame module 184 and the chassis 116 so as to support various components of the off-road vehicle 100, such as engine components, as well as a transaxle and rear differential (not shown). For example, in the illustrated embodiment of FIGS. 5A-6B, a frame component mount 220 may be fastened to the chassis 116 so as to be advantageously located within the rear frame module 184 to support the abovementioned components. As best shown in FIG. 6B, the frame component mount 220 may be fastened to the chassis 116 by way of brackets 224 configured to receive suitably sized bolts and nuts. It is contemplated that the brackets 224 may be welded onto the chassis 116, such that one or more holes in the brackets 224 may be aligned with mounting holes in the frame component mount 220.

Moreover, it is further contemplated that any of various brackets, holes, or openings may be coupled with, or disposed on, the frame component mount 220 for the purpose of fixedly receiving various components of the off-road vehicle, as described herein. For example, as best shown in FIG. 6A, two component mounting brackets 228 are coupled with the frame component mount 220. The component mounting brackets 228 may be welded, or otherwise fastened onto the frame component mount 220, without limitation, in a parallel orientation to facilitate supporting a relatively heavy component of the vehicle 100. Further, as shown in FIG. 5A, holes 232 are disposed in various locations of the frame component mount 220. It is contemplated that the holes 232 may be strategically located so as to receive various components that are intended to be fastened onto the frame component mount 220.

It should be understood that neither the rear frame module 184 nor the front frame module 144 are to be limited to the specific shapes and structures shown in the illustrations and disclosed herein. In particular, the various brackets, holes, openings, and couplers disclosed herein are intended to be exemplary in nature, and thus any of the disclosed brackets, holes, openings, and couplers may be modified, varied, or exchanged for an equivalent, without limitation and without deviating beyond the spirit and scope of the present disclosure.

Moreover, it should be understood that the modular chassis disclosed herein is not limited solely to the chassis 116, the front frame module 144, and the rear frame module 184, but rather it is contemplated that the chassis 116 may be further comprised of one or more modules, as desired. For example, in some embodiments, the chassis 116 may be comprised of the abovementioned roll-over protection system 104 implemented as a single component, or an assembly of components, that may be fastened onto the chassis 116, and removed therefrom as needed. It is further contemplated that the one or more modules comprising the chassis 116 may include any of various brackets, mounts, holes, openings, couplers, and the like, that may be deemed necessary to assemble the modules comprising the chassis 116 and to couple vehicle components with the chassis, without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A modular chassis for an off-road vehicle, comprising:
   a chassis configured to support components of the off-road vehicle;
   a front frame module configured to be coupled with a front of the chassis; and;
   a rear frame module configured to be coupled with a rear of the chassis wherein a lower portion of the rear frame module is comprised of parallelly disposed bottom frame members that extend rearward with respect to the chassis, each toward a bent portion that joins each of the bottom frame members with an angled frame member that extends upwards along a lower rear portion of the off-road vehicle to a bent portion that joins each of the angled frame members with a vertical frame member that extends acutely toward a top frame member, and
   a bottom mount of the rear frame module is configured to couple the bottom frame members with the chassis wherein the bottom mount is comprised of brackets that are configured to fastenably receive the bottom frame members to the chassis, a cross-member being disposed between the bottom frame members and receivable between the brackets so as to fixedly join the bottom frame members with the chassis.

* * * * *